July 20, 1965 H. T. PRESTIGE 3,195,227
METHODS OF INSERTING INSERTS THROUGH SOLID BODIES
Filed Jan. 23, 1963 4 Sheets-Sheet 1
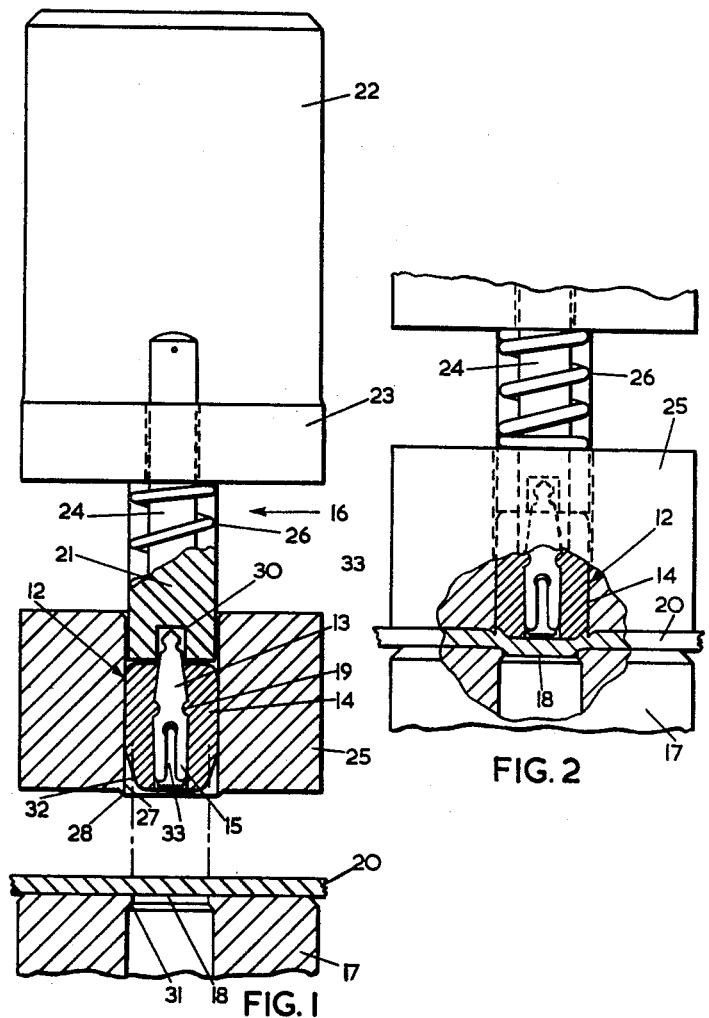
INVENTOR
H. T. Prestige
By [signature]
ATTORNEYS July 20, 1965     H. T. PRESTIGE     3,195,227

METHODS OF INSERTING INSERTS THROUGH SOLID BODIES

Filed Jan. 23, 1963

INVENTOR
H. T. Prestige
ATTORNEYS

July 20, 1965     H. T. PRESTIGE     3,195,227

METHODS OF INSERTING INSERTS THROUGH SOLID BODIES

Filed Jan. 23, 1963     4 Sheets-Sheet 3

INVENTOR
H. T. Prestige
By
ATTORNEYS

July 20, 1965　　　H. T. PRESTIGE　　　3,195,227
METHODS OF INSERTING INSERTS THROUGH SOLID BODIES
Filed Jan. 23, 1963　　　　　　　　　　　　4 Sheets-Sheet 4

INVENTOR
H. T. Prestige
By Holcombe, Wetherill & Brisebois
ATTORNEYS

United States Patent Office 3,195,227
Patented July 20, 1965

3,195,227
METHODS OF INSERTING INSERTS THROUGH SOLID BODIES
Harry T. Prestige, Dartford, Kent, England, assignor to J & S Engineers Limited, Crayford, Kent, England, a British company
Filed Jan. 23, 1963, Ser. No. 253,383
Claims priority, application Great Britain, Oct. 24, 1962, 40,253/62
13 Claims. (Cl. 29—423)

This invention relates to a method of inserting inserts through solid bodies and more particularly to the insertion of inserts which include cavities or projections liable to collapse upon insertion.

In my copending U.S. application Serial No. 180,742 there is disclosed a method of inserting an insert into an imperforate sheet of material, in which the insert is located between a punch and a die, the sheet is located between the insert and the die, an insert shrouding member is located between the sheet and the punch, the shrouding member having a bore therethrough through which the insert may pass and in which the punch is a sliding fit, and pressure is applied between the shrouding member and the die to produce a sealing contact between the shrouding member and the sheet. Pressure is then applied between the punch and the die so as to compress the insert within the bore of the shrouding member. At least part of the insert is made of soft material which due to the seal between the shrouding member and the bore is sufficiently compressed to act as a liquid and fill all the available space in the bore of the shrouding member. The insert exerts hydrostatic pressure on the sheet of material to press out a piece of the sheet into the die, part of the insert thereafter passing through the aperture left by the pressed-out piece of material.

In my further copending British application No. 37,689/61 there is described a method of and apparatus for inserting a socket element through an imperforate plate. The socket element includes a cavity normally intended to receive a pin for electrical connection to the socket terminals. In order to insert such an insert, in which there is a cavity, in an imperforate plate it is necessary to plug the cavity temporarily to prevent the sides collapsing and being permanently deformed when the insert is compressed to act as a liquid.

One object of the present invention is to provide a method of inserting an insert having a cavity through an imperforate sheet of harder material.

According to the invention there is provided a method of inserting into an imperforate sheet an insert comprising a first portion having the maximum cross-sectional area of said insert in a plane parallel to said sheet and a second portion having a smaller cross-sectional area in said plane. Said second portion may consist of a portion having the same outer diameter as the first portion but provided with an axial cavity, or a projection having a smaller outer diameter than said first portion. The method comprises the steps of respectively, locating the plugged or padded insert with a leading end of the insert directed towards said imperforate sheet between a punch and an aperture of a die so that the insert is located between the imperforate sheet and the punch, inserting the insert in the sheet by bringing the punch and die together at least until at least part of the leading end of the insert is driven through the sheet, thereby shearing a piece from the sheet into the die aperture and leaving at least part of the insert in the place of the said piece, and thereafter unplugging the cavity or removing the padding from the projection respectively.

Other features of the invention will become apparent from the following description of embodiments of the invention, reference being made to the accompanying drawings, in which:

FIGURE 1 is a partly sectioned elevational view of an apparatus for inserting a weak or flexible insert which has a cavity formed therein into a sheet in accordance with the invention, the apparatus being at the starting stage of the operating cycle;

FIGURE 2 is a view similar to that of FIGURE 1 when at an intermediate stage of the operating cycle;

Figure 3:
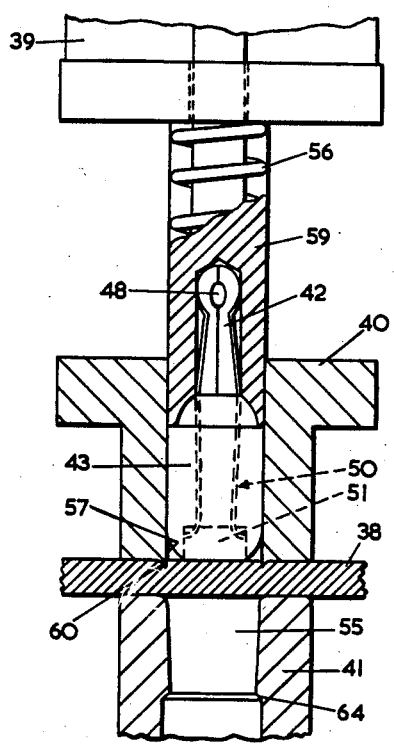
FIGURE 3 is a sectioned elevational view of a modified apparatus for inserting a weak or flexible insert which has a cavity formed therein into a sheet or plate in accordance with the invention, the apparatus being at the starting stage of the operating cycle.

Referring to FIGURES 1 and 2 of the drawings, an electrical socket 12 constituting the insert to be inserted comprises at least one terminal 13, and possibly a plurality of such terminals in a row perpendicular to the plane of the drawing, each being mounted in the bore of a weak or flexible housing 14, and secured therein by an internal annular projection 19 on the housing engaging a waist or recess in the terminal 13. It will be noted from FIGURE 1 that the part of the terminal 13 above the projection 19 completely fills the bore in the upper part of the housing. The part of the terminal 13 below the projection 19, however, comprises two arms 15 which define between them an opening which is to receive eventually a terminal pin (not shown) between the arms 15 of the socket terminal. It will thus be seen that the cross-sectional area, in a plane parallel to that of the sheet 20, of that portion of the composite socket which comprises the arms 15, is less than the cross-sectional area of the portion of the socket above the projection 19 by the area of the space between the arms 15. The socket is located in the ram 16 of a punch and die apparatus with the open end of the insert directed downwardly towards a sheet 20 of material in which the socket is to be mounted lying horizontally on the rim of a rectangular section die aperture 18 of a split die 17 located beneath the ram.

The aperture 18 is of smaller cross-sectional dimensions than the socket 12.

The ram 16 comprises a central rectangular sectioned punch 21 supported by an upwardly extending shank 22. The upwardly extending shank 22 is integral with two outwardly directed flanges 23 (only one of which is visible in the figures) each flange carrying a pin 24 which is slidable in the flange and extends downwardly into a keep block or shrouding member 25. One end of each pin is secured in the keep block or shrouding member (e.g. by threaded engagement) and the other end above the flange is prevented from passing through the flange. The keep block 25 is normally biased away from the flanges 23 by two springs 26 threaded on the pins 24.

The keep block has a rectangular section bore 27 which has a downwardly projecting lip 28 and is dimensioned to fit closely around the socket 12. The punch 21 has the same cross section as the bore 27 so as to be a sliding fit therein and normally the lower end of the punch 21 lies just within the bore 27. The bottom surface of the punch 21 abuts the adjacent surface of the socket 12 and has a longitudinal groove 30 into which the terminal or terminals of the socket project. The aperture of the die bore 18 is restricted by an inwardly projecting lip 31 so that the length of the aperture is the same as that of the socket 12 (perpendicular to the plane of the drawing) but the width is substantially less than the socket width as shown in the figures.

The original shape of the socket housing is such that its end surfaces are parallel but its sides are parallel for only about two thirds of their depth and then are inclined so as to produce a taper 32 towards the lower surface. In order to prevent the arms of the socket contact or wall surrounding the bore of the housing from collapsing due to the high surrounding pressure during the insertion operation, a dummy plug 33 is inserted in each contact to fill or seal the cavity in the socket, and is removed after the insertion operation is completed. The plug 33 need not be the same material as either the insert or the sheet 20, and is indeed preferably harder or more rigid than the sheet 20.

In operation the ram is moved downwards and carries the keep block 25 with it. First the bottom surface of said block engages the top surface of sheet 20. The keep block is accordingly arrested and the punch 21 continues to descend in opposition to the pressure of the spring 26. The springs 26 are sufficiently powerful for the keep block to exert considerable thrust on the sheet 20, and an effective seal is formed between the lip 28 and the surface of the sheet.

The punch 21 as it continues to descend carries the socket 12 with it, and as the lower end of the socket housing 14 engages the upper surface of the sheet and, as the part 21 continues to descend, the housing deforms until in the manner of a liquid it fills the space within the bore of the keep block, and the pressure exerted hydrostatically by the housing behaving as a liquid causes a rectangular slug of substantially the same cross-sectional dimensions as the die aperture 18 to be sheared out from said plate into the die aperture, through which it falls.

The hydrostatic pressure is now relieved, and it is believed that the lower portion of the housing 14, now behaving in its normal manner as a resilient body, is forced through the aperture in the plate left by said rectangular slug into the relatively small aperture in the die.

FIGURE 2 shows the parts immediately prior to the rectangular slug of metal falling into the die aperture. Because the slug is substantially the same size as the die aperture 18, which is smaller than the socket 12, the socket 12 makes a force fit in the aperture in the plate left by the slug, and the socket 12 is firmly held by the plate.

The socket described could have been inserted with the opposite end leading though it has been found convenient to insert multi-terminal sockets in the manner illustrated.

For forming the dummy plug 33 it is preferred to use a solid at least harder than the material of the sheet 20 in order to avoid deformation of the cavity when the insert is forced through the aperture. For instance, it is preferred to plug the cavity of a nylon insert with a brass plug when inserting the insert in a resin-bonded plastics laminate sheet.

Where the opening of the insert cavity faces towards the punch, the plug may be attached to the punch 21, provided that it is withdrawable from the insert after insertion in the direction of motion of the ram.

Figure 4:
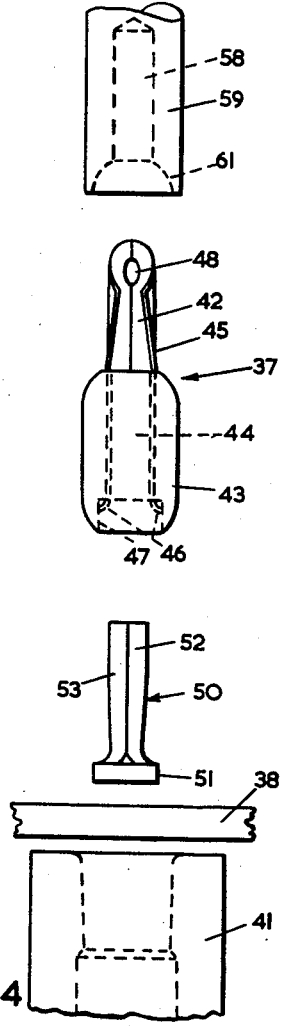
FIGURE 4 is an exploded elevational view of the apparatus and the insert of FIGURE 3, omitting the shrouding member.
Figure 6:
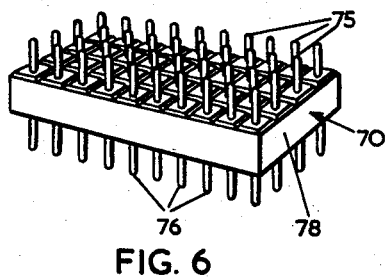
FIGURE 6 is a perspective view of an insert which has a plurality of projections and which is to be inserted in accordance with the invention into a plate.
Figure 7:
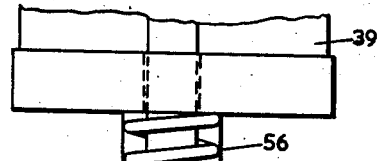
FIGURE 7 is a perspective view of a padding block to be used for protecting the projections on the insert of FIGURE 6 during insertion.
Figure 5:
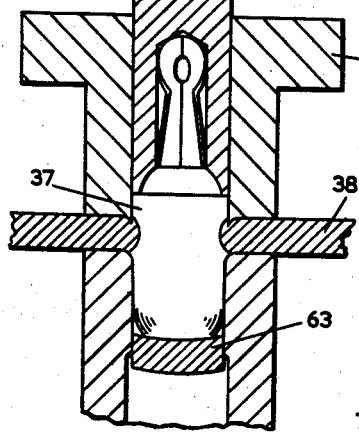
FIGURE 5 is a view similar to that of FIGURE 3 but after insertion of the insert into the plate.

Referring to FIGURES 3 to 5, an electrical socket 37 constitutes an insert to be inserted in an imperforate plate or panel 38, by means of a punch and die apparatus comprising a punch 39, keep block or shrouding member 40 and die 41.

The socket 37 is constituted by two parts, a metal terminal 42 of split construction and a plastics insulating sheath 43, which is rounded at its upper and lower ends, surrounding the lower end of the terminal 42. The socket is open at its lower end so that eventually when the socket is in use it will receive a terminal pin (not shown) which will fit inside a cavity or bore 44 in the terminal 42. The terminal 42 is retained in the sheath 43 by means of outwardly splayed ears 45 of the terminal 42 abutting the upper end of the sheath, and the outwardly splayed lower end 46 of the terminal 42 fitting in an enlargement 47 at the lower end of the bore 44. The terminal 42 has at its upper end an eyelet 48 for connection to a conductor.

This cavity or bore 44 would normally collapse if the insert were punched through the panel 38. In accordance with the invention, therefore the bore 44 is plugged by a split pin 50 before the insert is inserted in the panel 38. The pin 50 completely fills the bore 44 and has a head 51 to fill the enlargement 47 of the bore, being retained therein by pressure of the two limbs 52 and 53 of the split pin 50.

The panel 38 is placed over the aperture 55 of the die 41, and the socket 37 with the cavity plugging pin 50 is located within a bore 57 of the shrouding member 40 aligned with the die aperture 55, which is of smaller cross-sectional dimensions than the aperture 55, so that the pin head 51 is adjacent the panel 38, and the upper end of the terminal 42 is accommodated in a cavity 58 in an extension 59 of the punch 39, the punch 39 being disposed upwardly of the position shown in FIGURE 3. The extension 59 is a close sliding fit within the shrouding member bore 57.

The shrouding member 40 is resiliently connected to the punch 39 by compression springs 56 in a manner similar to the manner in which springs 26 in FIGURES 1 and 2 connect the punch 21 and shrouding member 25. Downward movement of the punch 39 causes the shrouding member 40 to be urged downwardly, compressing the springs 56 until a sharp annular ridge 60 surrounding the bore 57 bites into the panel 38, thereby effectively sealing the lower end of the bore 57.

The punch 39 is then moved further downwards to exert pressure on the sheath 43, until at the position shown in FIGURE 3 the upper end of the sheath 43 has been slightly deformed to the shape of the flared lower end 61 (see FIGURE 4) of the cavity 58, and continued downward movement of the ram 39 causes the sheath 43 to deform further, until in the manner of a liquid it fills the space within the bore 57 of the shrouding member 40, and the pressure exerted hydrostatically by the sheath 43 behaving as a liquid causes a rectangular slug 63 of substantially the same cross-sectional dimensions as the die aperture 55 (see FIGURE 5) to be sheared from the panel 38 into the die aperture 55, the upper edge of the die aperture 55 being flared outwardly as shown to facilitate punching of the slug 63. The slug falls through the die aperture 55, which is widened at 64 to facilitate passage of the slug.

During downward movement of the punch 39, no force is exerted on the upper end of the terminal 42, a clearance existing between the terminal 42 and the walls of the cavity 58.

The hydrostatic pressure is now relieved, and it is believed that the lower portion of the housing, now behaving in its normal manner as a resilient body, is forced through the relatively small aperture in the plate left by said rectangular slug into the aperture in the die.

Since the aperture in the plate is substantially the same size as the die aperture 55, which is smaller than the socket 37, the socket 37 makes a force fit in the aperture in the plate left by the slug 63, and the socket 12 is firmly held by the plate.

The punch 39 continues downwards through the shrouding member, driving the socket 37 into the panel, and it will be obvious that, having determined precisely the extent to which the insert 37 is to be driven into the panel 38, the punch 39, shrouding member 40 and springs 56 must be dimensioned to avoid bottoming of the springs 56.

After the punch 39 has been withdrawn, the panel with the inserted socket may be taken off the die and the cavity plugging pin 50 extracted from the bore 44 of the terminal 42. It will be seen from FIGURE 5 that the panel 38 fits tightly round the sheath 43 to the extent of biting into the sheath and deforming it slightly.

Referring to FIGURES 6 to 10 of the drawings, a forty terminal plug 70 (shown clearly in FIGURE 6) is to be inserted in an imperforate panel 71 by means of a punch and die apparatus comprising a punch 72, shrouding member 73 and die 74.

Each of the brass terminal pins 75 and 76 which project upwardly and downwardly from the first or base portion 78 (see FIGURE 6 especially) obviously has a cross-sectional area in a plane parallel to the sheet 71 which is substantially less than that of the base portion 78 and these pins constitute second portions which are to be protected in accordance with the invention during insertion.

This protection is achieved for the lower terminals 76 by plugging them with a rectangular nylon padding member 77 which is of slightly smaller cross-sectional dimensions in a plane normal to the pins than the rectangular nylon base 78 of the plug 70 which supports the terminal pins, the padding member having holes 79 which are a close fit around the pins 76.

Figure 8:
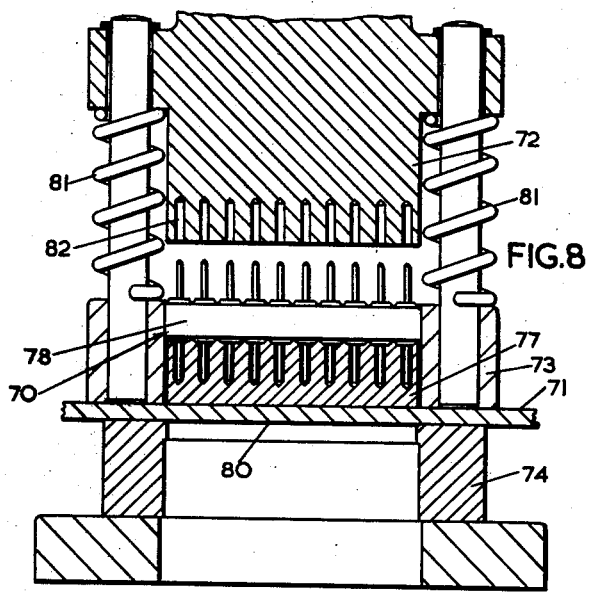
FIGURE 8 is a sectional view of an apparatus for inserting the insert of FIGURE 6 into a plate in accordance with the invention into an imperforate plate, the apparatus being at the starting stage of the operating cycle.

As shown in FIGURE 8, the panel 71 is placed over the die aperture 80, which is aligned with the punch 72, and the plug 70 and padding member 77 are located in line with the die aperture and punch within the shrouding member 73 (shown sectioned).

The die aperture 80 is of smaller cross-sectional dimensions than the plug 70 and padding member 77.

The shrouding member 73 is connected to the punch 72 by springs 81 in a manner similar to the manner in which the springs 26 in FIGURES 1 and 2 connect the shrouding member 25 to the punch 21. Downward movement of the punch 72 causes the shrouding member 73 to be urged against the panel, so that the gap is effectively sealed between the panel upper surface and the lower surface of the shrouding member.

Figure 9:
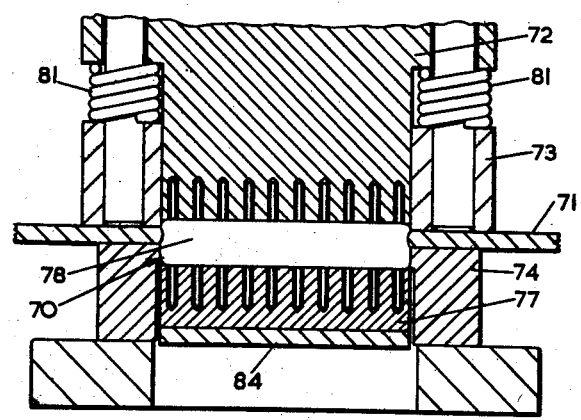
FIGURE 9 is a view similar to that of FIGURE 8 but after insertion of the insert in the plate.

The punch 72 descends further, and the upwardly projecting pins 75 of the plug are received into bores 82 in the base of the punch, which therefore serves also as a padding member. Continued downward movement of the punch 72 compresses the nylon base 78, and forces the padding member 77 through the panel 71, shearing a rectangular slug 84 (FIGURE 9), of substantially the same cross-sectional dimensions as the die aperture 80, from the panel 71 and forcing the base 77 into the panel 71 in place of the slug 84. The aperture left in the panel by the slug 84 is smaller than the unstressed cross-section of the nylon base 78, so that the panel 71 bites into the base 78 and holds it securely, as shown in FIGURE 9.

When the punch 72 is withdrawn, exposing the terminal pins 75, and after the panel and plug are lifted off the die, the padding member is removed from the plug 70, exposing the terminals 76.

Figure 10:
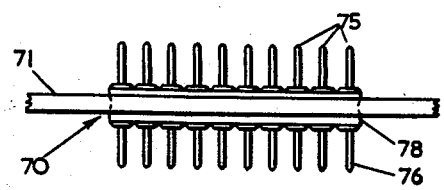
FIGURE 10 is a sectioned elevational view of the insert of FIGURE 6 after it has been inserted in the plate.

The panel 71 with the plug 70 inserted then has the form as illustrated by FIGURE 10.

It is contemplated that some material other than nylon, either metallic or non-metallic, might be used for the padding member 77.

It will be understood that the invention is not limited to the insertion of plugs or sockets such as those described above but may be applied to the insertion of any weak or flexible insert formed with a cavity which would otherwise tend to collapse during insertion.

I claim:
1. The method of seating in a sheet of material an insert positioned adjacent said sheet, said insert comprising a first portion having the maximum cross-sectional area of said insert in a plane parallel to said sheet and a second portion having a smaller cross-sectional area in a plane parallel to said sheet and projecting from said first portion in a direction perpendicular to said sheet, which method comprises the steps of supporting an area on the opposite side of said sheet from said insert which encircles an unsupported area in alignment with said insert, positioning readily removable padding means beside said second portion until the cross-sectional area of said second portion and padding means in a plane parallel to that of said sheet is equal that of said first portion, squeezing said sheet and said insert and padding means together until a piece of said sheet is sheared therefrom and replaced by said insert, and withdrawing said padding means.

2. The method of seating in a sheet of material an insert positioned adjacent said sheet, said insert comprising a first portion having the maximum cross-sectional area of said insert in a plane parallel to said sheet and a second portion having a smaller cross-sectional area in a plane parallel to said sheet and projecting from said first portion in a direction perpendicular to said sheet, which method comprises the steps of closely supporting the material of said first portion against movement parallel to said sheet by shrouding means also encircling said second portion and in which said insert is slidable perpendicularly of said sheet, supporting an area on the opposite side of said sheet from said insert which encircles an unsupported area in alignment with said insert, positioning readily removable padding means beside said second portion until the cross-sectional area of said second portion and padding means in a plane parallel to that of said sheet is equal to that of said first portion and said padding means and second portion are likewise supported by said shrouding means against movement parallel to said sheet, squeezing said sheet and said insert and padding means together while maintaining said support until a piece of said sheet is sheared therefrom and replaced by said insert, and withdrawing said support and said padding means.

3. The method claimed in claim 2 according to which said second portion is annular in cross-section so as to encircle an internal recess and said padding means is a plug inserted in said recess.

4. The method claimed in claim 2 according to which said second portion is a protuberance having a diameter less than that of said first portion in a plane parallel to said sheet and said padding means encircles said protuberance.

5. The method claimed in claim 2, in which said padding means is made of a material harder than that of said sheet.

6. The method claimed in claim 2 in which said shrouding means is brought into sealing contact with said sheet.

7. The method claimed in claim 2 according to which said second portion projects from said first portion toward said sheet.

8. The method claimed in claim 2 according to which said second portion projects from said first portion away from said sheet.

9. The method claimed in claim 2 according to which said second portion comprises a plurality of protuberances projecting from said first portion in a direction perpendicular to said sheet.

10. The method claimed in claim 2 including the step of applying pressure urging said shrouding means and sheet together so as to produce said sealing contact therebetween.

11. The method claimed in claim 2 according to which the area on the opposite side of said sheet encircled by said supported area is slightly smaller than said cross-section in at least one dimension.

12. The method claimed in claim 2 according to which said insert is made at least partly of a resilient material softer than that of said sheet.

13. The method claimed in claim 2 according to which said insert comprises an insulating sheath encircling at least one end of an electrical conductor and provided with a recess in the portion thereof adjacent said sheet, said recess communicating with said conductor.

References Cited by the Examiner
UNITED STATES PATENTS 2,841,863 7/58 Geisler _____ 29—413
3,015,884 1/63 Chamberlain _____ 29—423
3,093,887 6/63 Prestige et al. _____ 29—432

FOREIGN PATENTS 1,043,869 6/53 France.
497,270 12/38 Great Britain.

WHITMORE A. WILTZ, *Primary Examiner.*

THOMAS H. EAGER, *Examiner.*